United States Patent [19]

Abel et al.

[11] 4,343,620

[45] Aug. 10, 1982

[54] PROPYLENE OXIDE POLYADDUCTS CONTAINING CARBOXYL GROUPS AND THEIR SALTS

[75] Inventors: Heinz Abel, Reinach; Paul Schäfer, Riehen, both of Switzerland

[73] Assignee: Ciba-Geigy Corporation, Ardsley, N.Y.

[21] Appl. No.: 219,202

[22] Filed: Dec. 22, 1980

Related U.S. Application Data

[60] Division of Ser. No. 117,912, Feb. 4, 1980, abandoned, which is a continuation of Ser. No. 870,902, Jan. 19, 1978, abandoned.

[30] Foreign Application Priority Data

Jan. 24, 1977 [LU] Luxembourg ............................ 76633

[51] Int. Cl.$^3$ ............................................. C09B 67/00
[52] U.S. Cl. .......................................... 8/557; 8/681; 8/685; 8/917; 260/208; 260/410.6; 260/410.7; 260/410
[58] Field of Search ................... 8/557, 680, 917, 681, 8/685; 252/88

[56] References Cited

U.S. PATENT DOCUMENTS 4,055,393 10/1977 Schafer et al. ........................ 8/582
4,286,960 9/1981 Schneider et al. ..................... 8/527

*Primary Examiner*—A. Lionel Clingman
*Attorney, Agent, or Firm*—Edward McC. Roberts

[57] ABSTRACT

A propylene oxide polyadduct containing carboxyl groups, or a salt thereof, obtained from (a) an adduct of propylene oxide and an aliphatic alcohol having 3 to 10 carbon atoms which is at least trihydric, (b) an aliphatic dicarboxylic acid or the anhydride thereof having 2 to 10 carbon atoms or a mono- or di-lower alkylester of said dicarboxylic acids, (c) an aliphatic diol having an average molecular weight of at most 2,000, (d) a fatty acid having 8 to 22 carbon atoms and (e) an aromatic dicarboxylic acid or the anhydride thereof having 8 to 12 carbon atoms; it is in particular useful as dyeing assistant for the dyeing of fibrous material made of or containing wool with anionic dyes.

38 Claims, No Drawings

PROPYLENE OXIDE POLYADDUCTS CONTAINING CARBOXYL GROUPS AND THEIR SALTS

This is a divisional of application Ser. No. 117,912, filed on Feb. 4, 1980, abandoned, which is a continuation of application Ser. No. 870,902, filed Jan. 19, 1978, now abandoned.

The present invention relates to novel propylene oxide polyadducts containing carboxyl groups, and salts thereof, a process for their preparation and their use as dyeing assistants for the dyeing of fibrous material made of or containing wool with anionic dyes.

The characterising feature of the novel adducts is that they have been prepared from (a) an adduct of propylene oxide and an aliphatic alcohol having 3 to 10 carbon atoms which is at least trihydric, (b) an aliphatic dicarboxylic acid or the anhydride thereof having 2 to 10 carbon atoms or a mono- or dilower alkyl ester of said dicarboxylic acid, (c) aliphatic diol having an average molecular weight of at most 2,000, (d) a fatty acid having 8 to 22 carbon atoms and (e) an aromatic dicarboxylic acid or the anhydride thereof having 8 to 12 carbon atoms.

In the manufacture component (e) is advantageously employed at the end.

The novel adducts can be in the form of the free acids or in the form of salts, for examle alkali metal salts or ammonium salts. Alkali metal salts are, in particular, the sodium and potassium salts and ammonium salts are the ammonium, trimethylammonium, monoethanolammonium, diethanolammonium and triethanolammonium salts.

Preferably, the novel adduct is synthesised from 1 mol of component (a), 2 to 4 mols of component (b), 2 to 4 mols of component (c), 1 to 2 mols of component (d) and 2 to 4 mols of component (e).

Component (a) is in particular an adduct of propylene oxide and a trihydric to hexahydric alkanol having 3 to 6 carbon atoms. This alkanol can be straight-chain or branched. An example is glycerol, trimethylolpropane, erythritol, pentaerythritol, mannitol or sorbitol.

The reaction product of component (a) can be prepared, for example, by adding about 2 to 20 mols, preferably 4 to 12 mols, of propylene oxide onto 1 mol of the trihydric to hexahydric alcohol.

Suitable adducts are in particular those of 4 to 8 mol; of propylene oxide and 1 mol of pentaerythritol.

The aliphatic dicarboxylic acid of component (b) can be saturated or ethylenically unsaturated and preferably has 4 to 10 carbon atoms. An aliphatic saturated dicarboxylic acid which can be used is, for example, oxalic acid, malonic acid, succinic acid, glutaric acid, adipic acid, pimelic acid, suberic acid, azelaic acid or sebacic acid, or an anhydride thereof, especially succinic anhydride or glutaric anhydride.

An ethylenically unsaturated dicarboxylic acid is preferably fumaric acid, maleic acid or itaconic acid or also mesaconic acid, citraconic acid or methylenemalonic acid. An anhydride of these acids is in particular maleic anhydride and this is also the preferred component (b).

As component (b) may also be used a monoalkylester or in particular a di-lower alkyl ester of said aliphatic dicarboxylic acids, especially the dimethyl or diethyl ester.

Component (c) is preferably a diol of the formula:

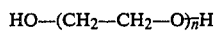

$$HO-(CH_2-CH_2-O)_nH \quad (1)$$

in which n is 1 to 40 and preferably 1 to 15. An example of such a diol is ethylene glycol, diethylene glycol or a polyethylene glycol having an average molecular weight of 150 to 1,500, especially 200 to 300. Further aliphatic diols can also be 1,3- or 1,2-propylene glycol, 1,5-pentanediol, dipropylenglycol or a polypropyleneglycol having an average molecular weight of 190 to 1500.

The fatty acid of component (d) is a saturated or unsaturated acid, for example caprylic acid, capric acid, lauric acid, myristic acid, palmitic acid, stearic acid, arachic acid, coconut fatty acid ($C_{10}$–$C_{16}$), behenic acid, decenoic acid, dodecenoic acid, tetradecenoic acid, hexadecenoic acid, oleic acid, linoleic acid, linolenic acid, ricinoleic acid, eicosenoic acid, docosenoic acid or clupanodonic acid.

Oleic acid, palmitic acid, stearic acid and especially coconut fatty acid are of primary interest.

Component (e) is preferably a monocyclic or dicyclic aromatic dicarboxylic acid having 8 to 12 carbon atoms, especially a benzenedicarboxylic acid, for example phthalic acid, isophthalic acid or terephthalic acid, or a naphthalenedicarboxylic acid.

Anhydrides of the aromatic dicarboxylic acids are in particular phthalic anhydride, which can be substituted by methyl, and naphthalenedicarboxylic acid anhydride. The preferred component (e) is phthalic anhydride.

Preferred propylene oxide polyadducts containing carboxyl groups are obtained from the following components: ($a_1$) an adduct of propylene oxide and a trihydric to hexahydric alkanol having 3 to 6 carbon atoms, ($b_1$) a saturated or ethylenically unsaturated aliphatic dicarboxylic acid, or the anhydride thereof, having 4 to 10 carbon atoms, especially maleic anhydride, ($c_1$) an aliphatic diol of the formula (1), $HO-CH_2CH_2O)_nH$, in which n is 1 to 40, preferably ethylene glycol, diethylene glycol or a polyethylene glycol having an average molecular weight of 150 to 1,500 and especially 200 to 500, ($d_1$) a saturated or unsaturated fatty acid having 8 to 22 carbon atoms, especially oleic acid, palmitic acid, stearic acid or in particular coconut fatty acid and ($e_1$) a benzene-dicarboxylic acid or the anhydride thereof, especially phthalic anhydride.

Typical representatives of the novel adducts are reaction products of:

1. 1 mol of the condensation product of 1 mol of pentaerythritol and 4 to 8 mols of propylene oxide, 3 mols of maleic anhydride, 3 mols of diethylene glycol, 1 mol of coconut fatty acid and 3 mols of phthalic anhydride, 2. 1 mol of the condensation product of 1 mol of pentaerythritol and 4 to 8 mols of propylene oxide, 3 mols of maleic anhydride, 3 mols of a polyethylene glycol having an average molecular weight of 200, 1 mol of coconut fatty acid and 3 mols of phthalic anhydride, 3. 1 mol of the condensation product of 1 mol of pentaerythritol and 4 to 8 mols of propylene oxide, 3 mols of glutaric anhydride or succinic anhydride, 3 mols of diethylene glycol or a polyethylene glycol having an average molecular weight of 200, 1 mol of coconut fatty acid and 3 mols of phthalic anhydride, 4. 1 mol of the condensation product of 1 mol of pentaerythritol and 4 to 8 mols of propylene oxide, 3 mols of maleic anhydride, 3 mols of diethylene glycol or a polyethylene glycol having an average molecular weight of 200, 1 mol of stearic acid and 3 mols of phthalic anhydride and 5. 1 mol of the condensation product of 1 mol of pentaerythritol and 8 mols of propylene oxide, 3 mols of maleic anhydride, 3 mols of diethylene glycol, 1 mol of oleic acid or palmitic acid and 3 mols of phthalic anhydride.

Adducts 1 to 5 can be in the form of the free acids or in the form of salts, especially in the form of sodium salts or ammonium salts.

The novel adducts are prepared by known methods. One process for the preparation of these products comprises reacting component (a) with components (b), (c) and (d), subsequently subjecting the reaction product to a further condensation reaction with component (e) and, if desired, converting the product into a salt. The reaction of component (a) with components (b), (c) and (d) is advantageously carried out in the presence of an acid catalyst and if desired in the presence of an inert organic solvent, at temperatures of 60° to 120° C. and preferably 80° to 100° C. A suitable catalyst is, for example, sulphuric acid or p-toluenesulphonic acid. A suitable organic solvent is, for example, benzene, toluene or xylene.

When dicarboxylic acids are used as component (b), the various components are preferably reacted at the same time with the adduct of component (a). If anhydrides of aliphatic dicarboxylic acids are employed as component (b), the esterification is advantageously carried out stepwise. In a first stage, for example, the propylene oxide adduct (component (a)) is reacted, in the presence of a polymerisation inhibitor, for example di-(tert.-butyl)-p-cresol, with the anhydride, by warming to 80° to 100° C., to give the monoester of the dicarboxylic acid and this is then further esterified in a second stage, with the addition of an acid catalyst and if desired in the presence of an inert organic solvent, for example benzene or toluene, with a diol as component (c) and a fatty acid (component (d)), or an ester of components (c) and (d), for example a polyethylene glycol mono-fatty acid ester.

The reaction product is finally subjected to a further condensation reaction with component (e), advantageously in the presence of a tertiary base, for example pyridine or tri-n-butylamine.

Depending on their composition, the adducts according to the invention are solid to liquid highly viscous products. They can therefore be in the form of waxes, pastes or oils and as a rule are colourless or at most slightly yellow or brown-coloured. They can be defined by their Gardner viscosities measured on 50% strength solutions in ethanol at 25° C. The viscosities are in the range of $A_1$ to $A_4$ or A to I.

The infrared spectrum of the reaction products has characteristic bands at 2,930, 2,880, 1,750, 1,455, 1,400, 1,380, 1,350, 1,260 and 1,120 cm$^{-1}$.

The novel adducts are suitable for very diverse purposes in textile application. In particular they are used as assistants when dyeing fibrous material made of or containing wool with anionic dyes.

Accordingly, the invention also provides a process for dyeing fibrous material made of or containing wool with anionic dyes, which comprises treating said material, before or during dyeing, with a preparation which contains (1) a propylene oxide polyadduct containing carboxyl groups, according to the invention, of components (a), (b), (c), (d) and (e), or a salt thereof, (2) a non-ionic, surface-active alkylene oxide adduct of a monoalcohol having at least 8 carbon atoms, a trihydric to hexahydric aliphatic alcohol, a phenol, which can be substituted by alkyl or phenyl, a fatty acid having 8 to 22 carbon atoms or a dicarboxylic acid having 3 to 10 carbon atoms, and, if desired, at least one of the following components: (3) a reaction product of a fatty acid having 8 to 22 carbon atoms and a primary or secondary amine containing at least one hydroxy-lower alkyl or lower alkoxy-lower alkyl group, or an alkylene oxide adduct of the reaction product containing hydroxyalkyl groups, (4) a water-immiscible solvent which boils above 80° C., (5) an anionic surfactant and (6) an amphoteric surfactant.

A preparation having a particularly good utility is one which contains components (1), (2) and (3) and especially (1), (2), (3) and (5).

Further useful preparations are those which contain components (1) to (4) or components (1), (2) and (4) or especially components (1), (2), (3) and (5) or (1), (2), (3), (5) and (6) or all of the components.

In addition, the above preparations can contain water and/or water-miscible organic solvents. An addition of this type serves to ensure the stability and homogeneity of the mixture but has no influence on the dyeing, for example levelness or depth of shade of the dyed fibrous material made of or containing wool.

Examples of water-miscible solvents are lower aliphatic alcohols, such as methanol, ethanol, the propanols or 2-methyl-2,4-pentanediol; ketones, such as acetone, methyl ethyl ketone or cyclohexanone; ethers and acetates, such as diisopropyl ether, diphenylene oxide, dioxane and tetrahydrofurane; monoalkyl ethers of glycols, such as ethylene glycol monomethyl ether, ethylene glycol monoethyl ether and ethylene glycol monobutyl ether and diethylene glycol monomethyl ether or diethylene glycol monoethyl ether, and also tetrahydrofurfuryl alcohol, pyridine, acetonitrile, diacetone alcohol, γ-butyrolactone, N,N-dimethylformamide, N,N-dimethylacetamide, tetramethylurea, tetramethylenesulphone and others.

Mixtures of the said solvents can also be used. Isopropanol and β-ethoxyethanol are preferred. In addition to these assistants, the preparation can advantageously also contain alkali metal hydroxides, for example sodium hydroxide or potassium hydroxide, or lower alkanolamines, such as monoethanolamine, diethanolamine or especially triethanolamine.

Component (2) is advantageously an adduct of 1 to 65 mols, preferably 3 to 12 mols, of an alkylene oxide, for example ethylene oxide and/or 1,2-propylene oxide, and 1 mol of an aliphatic monoalcohol having at least 8 carbon atoms, a phenol, which can be substituted by alkyl or phenyl, or a fatty acid having 8 to 22 carbon atoms. Higher aliphatic alcohols are, for example, water-insoluble monoalcohols having preferably 8 to 22 carbon atoms. These alcohols can be saturated or unsaturated and branched or straight-chain and can be employed on their own or as a mixture. Naturally occurring alcohols, for example myristyl alcohol, cetyl alcohol, stearyl alcohol or oleyl alcohol, or synthetic alcohols, such as, especially, 2-ethylhexanol, and also trimethylhexanol, trimethylnonyl alcohol, hexadecyl alcohol or the Alfols can be reacted with the alkylene oxide.

The Alfols are linear primary alcohols. The number behind the name indicates the average number of carbon atoms in the alcohol.

Some representatives of these alfols are alfol (8–10), (10–14), (12), (16), (18) and (20–22).

Further aliphatic alcohols which can be reacted with the alkylene oxides are trihydric to hexahydric alkanols. These preferably contain 3 to 6 carbon atoms and are in particular glycerol, trimethylolpropane, erythritol, pentaerythritol and sorbitol. The trihydric to hexahydric alcohols are preferably reacted with propylene oxide and ethylene oxide. The reaction products of 1 mol of glycerol, 51 mols of propylene oxide and 5 mols of ethylene oxide or of 1 mol of glycerol, 51 mols of propylene oxide and 12 mols of ethylene oxide may be mentioned as examples.

Suitable substituted or unsubstituted phenols are, for example, phenol, o-phenylphenol or alkylphenols in which the alkyl radical has 1 to 16 and preferably 4 to 12 carbon atoms. Examples of these alkylphenols are p-cresol, butylphenol, tributylphenol, octylphenol and especially nonylphenol.

The fatty acids have preferably 8 to 22 carbon atoms and can be saturated or unsaturated, for example capric acid, lauric acid, myristic acid, palmitic acid or stearic acid or decenoic acid, dodecenoic acid, tetradecenoic acid, hexadecenoic acid, oleic acid, linoleic acid, linolenic acid or ricinoleic acid.

The dicarboxylic acids have preferably 6 to 10 carbon atoms and in particular are reacted with propylene oxide or polypropylene glycols. Examples of dicarboxylic acids which can be used are malonic acid, succinic acid, glutaric acid, adipic acid, pimelic acid, suberic acid, azelaic acid or sebacic acid. Adipic acid and sebacic acid are preferred. The number of propylene oxide units in the reaction products can be 2 to 40.

Preferred alkylene oxide reaction products, which are employed as component (2) have the formula:

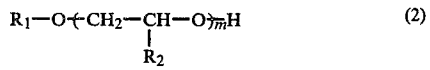

$$R_1-O-(CH_2-CH-O)_{\overline{m}}H \qquad (2)$$
$$\phantom{R_1-O-(CH_2-}|\phantom{CH-O)_{\overline{m}}H}$$
$$\phantom{R_1-O-(CH_2-}R_2$$

in which $R_1$ is alkyl or alkenyl, each having 8 to 18 carbon atoms, o-phenylphenyl or alkylphenyl having 4 to 12 carbon atoms in the alkyl moiety, $R_2$ is hydrogen or methyl and m is 1 to 40 and preferably 3 to 12.

Particularly preferred representatives of these alkylene oxide reaction products are the adducts of 3 to 5 mols of ethylene oxide and 1 mol of 2-ethyl-n-hexanol.

The reaction products of the higher fatty acids and the hydroxyalkylamines according to component (3) can be prepared, for example, by reacting fatty acids having 8 to 22 carbon atoms, for example caprylic acid, pelargenic acid, capric acid, myristic acid, palmitic acid, stearic acid or oleic acid and especially lauric acid or coconut fatty acid, with hydroxy-lower alkylamines, for example bis-hydroxypropylamine or preferably bis-hydroxyethylamine, or mixtures of these amines, the reaction being carried out in such a way that the molar ratio between the hydroxyalkylamine and the fatty acid can be greater than 1, for example 1.1:1 to 2:1. Condensation products of this type are described, for example, in U.S. Pat. No. 2,089,212.

Satisfactory results are obtained, in particular, by using, as component (3), amides which are derived from the said higher-molecular fatty acids and the following aliphatic amines: mono- or di-hydroxy-lower alkylamines, for example β-hydroxyethylamine, γ-hydroxypropylamine or β,γ-dihydroxypropylamine; bis-(ω-hydroxy-lower alkyl)-amines, for example bis-(β-hydroxyethyl)-amine, bis-(γ-hydroxypropyl)-amine or bis-(α-methyl-β-hydroxy)-ethylamine; N-lower alkyl-N-(α-hydroxy-lower alkyl)-amines, such as N-methyl- or N-ethyl-N-(β-hydroxyethyl)-amine or N-methyl- or N-ethyl-N-(γ-hydroxypropyl)-amine; or mono-ω-lower alkoxy-lower alkylamines, for example β-methoxy- or β-ethoxy-ethylamine or γ-methoxy- or γ-ethoxypropylamine.

In the definition of the radicals of the compounds used here, lower alkyl and lower alkoxy are as a rule those groups or group constituents which have 1 to 5 and especially 1 to 3 carbon atoms, for example methyl, ethyl, n-propyl, isopropyl, n-butyl, sec.-butyl or amyl and methoxy, ethoxy or isopropoxy.

The preferred amides used as component (3) are the bis-(ω-hydroxyalkyl)-amides of the said higher fatty acids, in particular those in which the hydroxyalkyl radicals contain 2 or 3 carbon atoms, for example bis-(β-hydroxyethyl)-amide or bis-(γ-hydroxypropyl)-amide of coconut fatty acid. Excellent results are also obtained with reaction products of 1 mol of coconut fatty acid and 2 mols of di-β-hydroxyethylamine.

Alkylene oxide adducts, and especially ethylene oxide adducts, of the abovementioned fatty acid alkanolamides are also suitable as component (3) and individual ethylene oxide units can be replaced by substituted epoxides, such as propylene oxide or styrene oxide. The number of alkylene oxide groups in these polyglycol ethers can be 1 to 100 and preferably 1 to 4.

The water-immiscible solvents which boil above 80° C. and are used as component (4) can be, for example, monohydric or dihydric aliphatic alcohols having at least 6 carbon atoms, for example 2-ethylbutanol, trimethylhexanol or neopentylglycol, and also benzyl alcohol and furfuryl alcohol; esters, such as ethyl benzoate, methyl salicylate, methyl or ethyl lactate or cyclic diesters of carbonic acid with glycols, especially with propylene glycol, such as propylene carbonate; amides, such as acetoacetic acid diethylamide, N,N-bis-(β-hydroxyethyl)-1,3-dichloroanilide, N-phenylurea or N,N-diethylthiourea, and also dioctyl phthalate, tricresyl phosphate and especially tributyl phosphate.

The anionic surfactants of component (5) are preferably anionic alkylene oxide adducts, for example adducts which contain acid ether groups or preferably ester groups of inorganic or organic acids, of alkylene oxides, especially ethylene oxide and/or propylene oxide or also styrene oxide, and organic hydroxy, carboxy, amino or amido compounds containing aliphatic hydrocarbon radicals having a total of at least 8 carbon atoms, or mixtures of these substances. These acid ethers or esters can be in the form of the free acids or in the form of salts, for example alkali metal salts, ammonium salts or amine salts.

These anionic surfactants are prepared according to known methods by adding at least 1 mol and preferably more than 1 mol, for example 2 to 60 mols, of ethylene oxide or alternately, in any order, ethylene oxide and propylene oxide onto the said organic compounds and subsequently etherifying or esterifying the adducts and if desired converting the ethers or the esters into their salts. Base materials which can be used are higher fatty alcohols, i.e. alkanols or alkenols having 8 to 22 carbon atoms, alicyclic alcohols, phenylphenols, alkylphenols having one or more alkyl substituents which contains, or which together contain, at least 8 carbon atoms, fatty acids having 8 to 22 carbon atoms, amines, which contain aliphatic and/or cycloaliphatic hydrocarbon radicals of at least 8 carbon atoms, especially fatty amines, hydroxyalkylamines or hydroxyalkylamides each containing radicals of this type and aminoalkyl esters of fatty acids or dicarboxylic acids and higher alkylated aryloxycarboxylic acids.

Component (5) can be, for example, a compound of the formula:

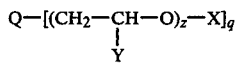

in which Q is $A_1$—O—, $A_2$—CO—O or $A_3$—N<, Y is hydrogen, methyl or phenyl, $A_1$ is an aliphatic hydrocarbon radical having 8 to 22 carbon atoms, a cycloaliphatic hydrocarbon radical having 10 to 22 carbon atoms, o-phenylphenyl or an alkylphenyl radical having 4 to 16 carbon atoms in the alkyl moiety, $A_2$ is an aliphatic hydrocarbon radical having 7 to 21 carbon atoms, $A_3$ is an aliphatic hydrocarbon radical having 12 to 22, especially 16 to 22 and in particular 16 to 18, carbon atoms, X is the acid radical of an inorganic, oxygen-containing acid or of a dicarboxylic acid or is the radical —$CH_2COOH$, z is 1 to 20 and q is 1, or 2 if Q is $A_3$—N<, the 2 substituents on the nitrogen atom being identical to or different from one another.

Very suitable components (5) of the formula (3) preferably have the formulae:

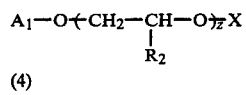 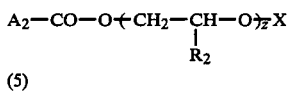

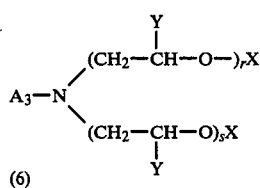

wherein Y, $A_1$, $A_2$, $A_3$, X and z are as defined and r and s are integers, the sum of which is 2 to 10, and $R_2$ is methyl or hydrogen.

The radical $A_1$—O— can be derived, for example, from higher alcohols, such as decyl alcohol, lauryl alcohol, tridecyl alcohol, myristyl alcohol, cetyl alcohol, stearyl alcohol, oleyl alcohol, arachidyl alcohol or behenyl alcohol or also from hydroabietyl alcohol or from o-phenylphenol or alkylphenols, for example butyl-, hexyl-, o-octyl-, n-nonyl-, p-tert.-octyl-, p-tert.-nonyl-, decyl-, dodecyl-, tetradecyl- or hexadecylphenol. The radical $A_2$—COO— is derived, for example, from fatty acids such as caprylic acid, lauric acid, capric acid, myristic acid, stearic acid, arachic acid, behenic acid, coconut fatty acid, decenoic acid, linoleic acid linolenic acid, eicosenic acid, docosenic acid or clupanodonic acid.

$A_3$ is preferably an alkyl or alkenyl radical having 12 to 22 and especially 16 to 22 carbon atoms. Y is preferably hydrogen. The sum of r+s is advantageously 6 to 8. $R_2$ and Y can each have different meanings in the same molecule.

An alkyl radical $A_3$ is, for example, n-dodecyl, myristyl, n-hexadecyl, n-heptadecyl, n-octadecyl, arachidyl or behenyl. An alkenyl radical $A_3$ is, for example, dodecenyl, hexadecenyl, oleyl or octadecenyl.

Preferred compounds are those of the formula (4) wherein $A_1$ is alkylphenyl having 4 to 12 carbon atoms in the alkyl moiety, o-phenylphenyl, or alkyl or alkenyl, each having 10 to 18 carbon atoms.

The aliphatic amines which are required as starting materials for the preparation of the preferred adducts of the formula (6) can contain saturated or unsaturated and branched or non-branched hydrocarbon radicals. These hydrocarbon radicals preferably contain 16 to 22 carbon atoms. The amines can be chemically a single compound or can be used in the form of mixtures. Amine mixtures employed are preferably those such as are formed when naturally occurring fats or oils, for example tallow fat, soya bean oil or coconut oil, are converted into the corresponding amines. Specifically, amines are dodecylamine, hexadecylamine, heptad cylamine, octadecylamine, arachidylamine, behenylamine an octadecenylamine. Tallow fatty amine is preferred. This is a mixture of 30% of hexadecylamine, 25% of octadecylamine and 45% of octadecenylamine.

Ethylene oxide, or, in order to introduce the methyl or phenyl group into the ethyleneoxy groups, also propylene oxide or styrene oxide can be added onto the amines. Propylene oxide and styrene oxide are preferably employed as mixtures with ethylene oxide. In this case, 1 to 3 mols of propylene oxide or styrene oxide and at least 3 mols or 4 mols or 5 mols of ethylene oxide are advantageously employed per mol of amine.

The acid radical X can be derived from organic, preferably aliphatic, dicarboxylic acids of 2 to 6 carbon atoms, for example from maleic acid, malonic acid, succinic acid or, especially, sulphosuccinic acid, or can be introduced by reaction with a halogenoacetic acid, for example chloroacetic acid. In this case it is linked via an ester or ether bridge to the radical:

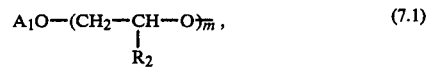

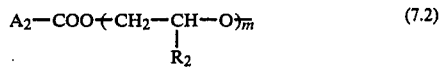

or

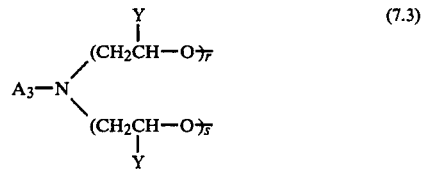

In particular, however, X is derived from inorganic polybasic oxyacids, for example orthophosphoric acid and especially sulphuric acid.

The acid radical X is preferably in the form of a salt, i.e., for example, in the form of an alkali metal salt, ammonium salt or amine salt. Examples of such salts are sodium, potassium, ammonium, trimethylamine, ethanolamine, diethanolamine or triethanolamine salts.

The alkylene oxide units

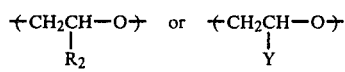

are as a rule ethylene oxide units or 1,2-propylene oxide units and the latter are preferably mixed with ethylene oxide units in the compounds of the formulae (3) to (6).

Anionic surfactants of particular interest are those of the formula (6) in which the radical $A_3$ is alkenyl or in particular alkyl each having 16 to 22 carbon atoms, Y is hydrogen, the sum of r and s is 2 to 10 and especially 4 to 10 and X is derived from sulphuric acid, the surfactant being in the form of an alkali metal salt, the ammonium salt or an amine salt.

Such surfactants are, for example, sulphated fatty alcohol polyglycol ethers having 2 to 10 ether groups, for example the sodium salt of sulphated lauryl alcohol glycol ether or the ammonium salt of sulphated lauryl alcohol triglycol ether.

Special combinations of components (3) and (5) have proved particularly suitable, especially mixtures of fatty acid alkanolamides, with said anionic surfactants of formulae (3) to (6) such as a mixture of coconut fatty acid N,N-bis-(2-hydroxyethyl)-amide or lauric acid N,N-bis-(2-hydroxyethyl)-amide with the bis-(2-hydroxyethyl)-ammonium salt of sulphated lauryl alcohol tri-glycol ether.

Frequently, mixtures of several and different anionic surfactants are also used.

In many cases it has proved advantageous to replace a proportion of component (5) by component (6). Component (6) is an amphoteric compound, i.e. a quaternised acid ester or a salt thereof, of a compound of the formula:

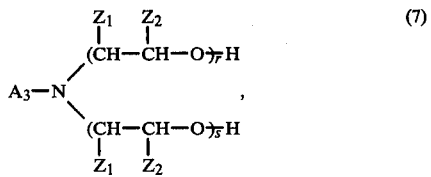

in which $A_3$, r and s are as defined and one of $Z_1$ and $Z_2$ is hydrogen, methyl or phenyl and the other is hydrogen.

Except for the quaternisation, the structure of component (6) corresponds to that of a component (5) of the type of the formula (6).

The quaternisation is effected by methods which are known per se. Conventional alkylating or aralkylating agents can be employed for the quaternisation. However, preferred quaternising agents are dimethyl sulphate, diethyl sulphate, chloroacetamide, ethylenechlorohydrin, ethylenebromohydrin, epichlorohydrin or epibromohydrin, as well as benzyl chloride.

The most preferred ester is the ammonium salt, quaternised with dimethyl sulphate, of the disulphate of the reaction product of 1 mol of tallow fatty amine with 2 to 9, and especially 6 to 8, mols of ethylene oxide.

It will be readily understood that components (1) to (6) can also be added to the liquor in the form of a preparation, before or during dyeing.

The preparations employed in the process according to the invention are especially suitable for increasing the diffusion of the dyes in the dye bath and thus allow an improvement in the levelness and complete exhaustion of the dye baths.

The preparations can be prepared by simply stirring the said components (1) to (6) at temperatures of 15° to 80° C. and especially at temperatures of 15° to 30° C. On subsequent addition of water and/or of a water-miscible solvent, the preparations are obtained in the form of homogeneous, preferably clear mixtures which are very highly stable on storage at room temperature. The novel preparations can, however, also be prepared without water or without the addition of the water-miscible solvent. In this case, concentrated preparations having a total active compound content of 25 to 75 percent by weight are obtained.

The preparations advantageously contain 10 to 70 percent by weight of component (1), 5 to 30 percent by weight of component (2), 0 to 25 percent by weight of component (3), 0 to 20 percent by weight of component (4), 0 to 5 percent by weight of a base and 0 to 65 percent by weight of water and/or of a water-miscible organic solvent, the percentages in each case being based on the preparation.

The water-miscible organic solvent is preferably isopropanol and/or one of the $\beta$alkoxyalkanols mentioned initially, especially $\beta$-ethoxyethanol. These solvents can be employed on their own or together with water.

Furthermore, the preparations can also contain 0 to 20 percent by weight of each of components (5) and (6).

If components (3), (4), (5) and (6), the base and the solvent are also used, individually, in pairs or together, the preparations can advantageously contain 0.1 to 25 percent by weight of component (3), 0.1 to 20 percent by weight of component (4), 0.1 to 20 percent by weight of component (5), 0.1 to 20 percent by weight of component (6) and 0.1 to 5 percent by weight of a base and/or of a water-miscible organic solvent, the percentages in each case being based on the preparations.

Particularly preferred preparations contain 10 to 30 percent by weight of component (1), 5 to 20 percent by weight of component (2), 5 to 20 percent by weight of component (3), 0 to 20 percent by weight of component (4), 1 to 3 percent by weight of an alkali metal hydroxide and 10 to 60 percent by weight of isopropanol, $\beta$-ethoxyethanol and/or preferably water, the percentages in each case being based on the total preparation.

The weight ratio of component (1) to component (2) advantageously varies between 10:1 and 1:3, preferably 3:1 and 1:2, and the weight ratio of component (1) to component (3) advantageously varies between 4:1 and 1:2, preferably between 2:1 and 1:1.

Further preferred preparations contain: 3 to 10 percent by weight of component (1), 3 to 10 percent by weight of component (2), 3 to 10 percent by weight of component (3), 0 to 10 percent by weight of component (4), 10 to 20 percent by weight of component (5), 0 to 15 percent by weight of component (6), 0.5 to 5 percent by weight of a base and 60 to 70 percent by weight of a water-miscible organic solvent and/or preferably water.

The quantitative proportion of the preparation in the dye bath is advantageously 0.5 to 4 percent by weight and preferably 1.5 to 3 percent by weight, based on the weight of the woollen material to be dyed.

Fibrous material made of or containing wool which can be dyed according to the invention is wool on its own or a mixture of wool/polyamide or wool/polyester. The fibrous material can be in very diverse stages of processing, for example in the form of yarns, flocks, piece goods or knitted fabrics or in the form of a bonded fibre web or preferably in the form of slubbing or loose fibres.

The anionic dyes are, for example, salts of metal-free or heavy metal-containing mono-, dis- or poly-azo dyes, including the formazane dyes, and also of the anthraquinone, xanthene, nitro, triphenylmethane, naphthoquinoneimine and phthalocyanine dyes. The anionic character of these dyes can be due to the formation of the metal complex alone and/or to acid, salt-forming substituents, such as carboxylic acid groups, sulphate groups and phosphonate groups, phosphoric acid groups or sulphonic acid groups. These dyes can also contain, in the molecule, reactive groupings which form a covalent bond with the wool.

Anionic dyes which are preferably used are 1:2 metal complex dyes. These contain a heavy metal atom, for example a cobalt atom or especially a chromium atom, as the central atom. Two complex-forming components are bonded to the central atom and of these at least one is a dye molecule but preferably both are dye molecules. Suitable dye molecules are, in particular, azo dyes which contain one substituent capable of forming a complex in the o-position and the o'-position relative to the azo bridge. The two dye molecules which participate in the formation of the complex can be identical to or different from one another and have only a single azo bridge or several azo bridges. Mixtures of the anionic dyes can also be employed.

1:2 Chromium mixed complexes of azo dyes, which complexes contain only one sulphonic acid group are of particular interest.

The amount of dyes added to the liquor depends on the desired depth of shade and in general amounts of 0.1 to 10 percent by weight, based on the fibrous material, have proved suitable.

The dye baths can contain mineral acids, such as sulphuric acid or phosphoric acid, organic acids, advantageously lower aliphatic carboxylic acids, such as formic acid, acetic acid or oxalic acid, and/or salts, such as ammonium acetate, ammonium sulphate or preferably sodium acetate. The acids serve in particular to adjust the pH of the liquors used according to the invention to the desired value, which as a rule is 4 to 7 and preferably 5 to 6. If the preparation according to the invention is applied before dyeing, the acid or the buffer mixture should advantageously be added to the pretreatment liquor.

The dyeing assistant preparations can also be processed, before carrying out dyeing, with the dyes to give solid, pasty or liquid dye preparations, which are distinguished by good stability and easy handling. Mixing can be effected, for example, in an aqueous medium, with subsequent drying, or by kneading in.

In addition to the dye and the said preparations, the dye baths can contain further customary additives, for example electrolytes, wool-protection agents, levelling agents, wetting agents and antifoams.

The liquor ratio can be chosen within a wide range, for example 1:1 to 1:100, preferably 1:10 to 1:50.

The fibrous material made of or containing wool is advantageously dyed from an aqueous liquor by the exhaust method, for example, at a temperature in the range of 60° to 120° C., preferably 80° to 98° C.

The dyeing time can vary depending on the requirements, but as a rule is only 15 to 45 minutes, which corresponds to a 25 to 75% reduction in the conventional dyeing time of 60 minutes.

Special equipment is not required for the process according to the invention. The conventional dyeing machines, for example open baths, jiggers, paddle or jet dyeing machines, circulation machines or winches, can be used.

Dyeing of the fibrous material is advantageously carried out by first treating the material, to be dyed, with the preparation and dyeing in the same bath after adding the dye. The procedure can also be that the preparation is applied during the dyeing process, in which case it is simply mixed into the aqueous dye liquor and applied to the textile material at the same time as the dye. The preparation can also be applied before dyeing in a separate bath and this pretreatment can be carried out either by the exhaust method or by the padding method. Preferably, the fibrous material made of or containing wool is introduced into a liquor which contains acid and the preparation and is at a temperature of 40° to 60° C. and the material is treated at this temperature for 5 to 15 minutes. The dyes are then added and the temperature of the dye bath is slowly raised in order to dye in the indicated temperature range for 15 to 45 minutes and preferably 20 to 40 minutes. Finally, the dyed material is withdrawn and dried in the conventional manner.

The dyeing method according to the invention gives level and strong dyeings which are also distinguished by good fastness to rubbing and colour yields. In addition, the other fastness properties of the dyeings, for example the fastness to light and the wet fastness properties, are not affected by the use of the mixture according to the invention.

Compared with the conventional method of dyeing wool, the method according to the invention has the advantage that the dyeing time is shortened and, in particular, complete exhaustion of the dye bath is achieved. As a result of this, rinsing of the textile material prior to drying can be dispensed with. In addition, the liquor can be employed for further dyeing, so that considerable savings are achieved in respect of water, energy, time and chemicals. Furthermore, a significant advance is achieved from the ecological point of view.

The method according to the invention is distinguished not only by these economic and ecological advantages but, in addition, the dyeings obtained have a greater depth of shade and an improved levelness, compared with those obtained from the methods used hitherto.

In the following Examples, the parts and percentages are by weight. The following reaction products and compounds are examples of components (2), (3) and (5) in the dyeing examples.

COMPONENT (2)

$A_1$: The reaction product of 3 mols of ethylene oxide and 1 mol of 2-ethyl-hexanol;

$A_2$: The reaction product of 5 mols of ethylene oxide and 1 mol of 2-ethyl-hexanol;

$A_3$: The reaction product of 3 mols of ethylene oxide and 1 mol of stearyl alcohol;

$A_4$: The reaction product of 9 mols of ethylene oxide and 1 mol of Alfol (1014);

$A_5$: The reaction product of 3 mols of ethylene oxide and 1 mol of hexadecyl alcohol;

$A_6$: The reaction product of 6 mols of ethylene oxide and 1 mol of oleyl alcohol;

$A_7$: The reaction product of 1 mol of ethylene oxide and 1 mol of phenol;

$A_8$: The reaction product of 4 mols of ethylene oxide and 1 mol of p-cresol;

$A_9$: The reaction product of 5 mols of ethylene oxide and 1 mol of tributylphenol;

A₁₀: The reaction product of 4 mols of ethylene oxide and 1 mol of octylphenol;

A₁₁: The reaction product of 3 mols of ethylene oxide and 1 mol of nonylphenol;

A₁₂: The reaction product of 4 mols of ethylene oxide and 1 mol of nonylphenol;

A₁₃: The reaction product of 6 mols of ethylene oxide and 1 mol of nonylphenol;

A₁₄: The reaction product of 8 mols of ethylene oxide and 1 mol of o-phenylphenol;

A₁₅: The reaction product of 51 mols of propylene oxide and 5 mols of ethylene oxide and 1 mol of glycerol;

A₁₆: The reaction product of 51 mols of propylene oxide and 12 mols of ethylene oxide and 1 ml of glycerol;

A₁₇: The reaction product of 3 mols of ethylene oxide and 1 mol of oleic acid; and A₁₈: The reaction product of 2 mols of polypropyleneglycol (molecular weight 1,000) and 1 mol of adipic acid;

COMPONENT (3)

B₁: Coconut fatty acid N,N-bis-(2-hydroxyethyl)-amide;

B₂: The adduct of 1 mol of ethylene oxide and 1 mol of coconut fatty acid N,N-bis-(2-hydroxyethyl)-amide;

B₃: Oleic acid N,N-bis-(2-hydroxyethyl)-amide;

B₄: The reaction product of 1 mol of coconut fatty acid and 2 mols of di-(2-hydroxy-ethyl)-amine;

B₅: Lauric acid N,N-bis-(2-hydroxyethyl)-amide; and

B₆: Coconut fatty acid N,N-bis-(3-hydroxypropyl)-amide.

COMPONENT (5)

C₁: The ammonium salt of the acid disulphuric acid ester of the formula:

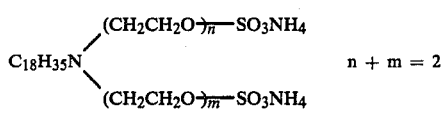

$n + m = 2$

C₂: The ammonium salt of the acid disulphuric acid ester of the formula:

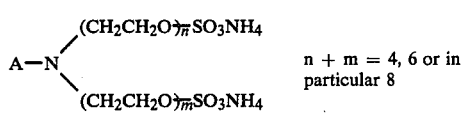

$n + m = 4, 6$ or in particular 8

C₃: The ammonium salt of the acid disulphuric acid ester of the formula:

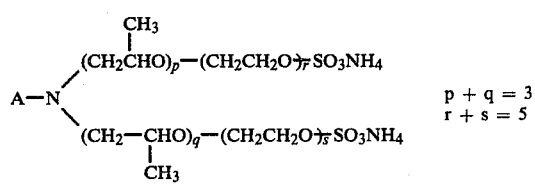

$p + q = 3$
$r + s = 5$

C₄: The ammonium salt of the acid disulphuric acid ester of the formula:

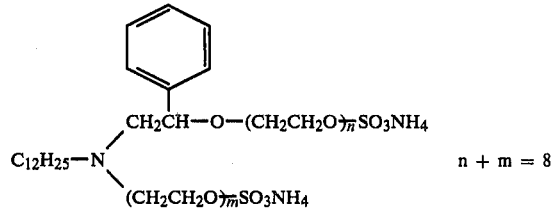

$n + m = 8$

C₅: The ammonium salt of the acid disulphuric acid ester of the formula:

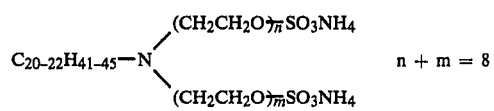

$n + m = 8$

C₆: The sodium salt of the disulphosuccinic acid half-ester of the formula:

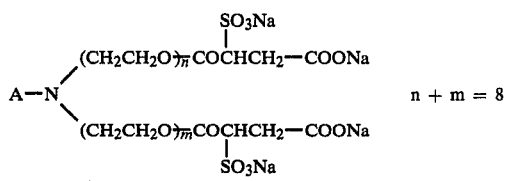

$n + m = 8$

C₇: The ammonium salt of the acid diphosphoric acid ester of the formula:

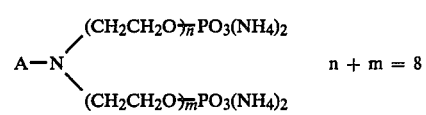

$n + m = 8$

COMPONENT (6)

D₁: The quaternary ammonium salt of the formula:

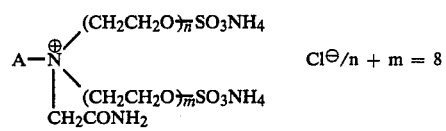

$Cl^\ominus / n + m = 8$ and

D₂: The quaternary ammonium salt of the formula:

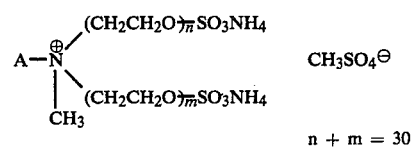

$CH_3SO_4^\ominus$ $n + m = 30$

A in each case is the hydrocarbon radical of tallow fatty amine.

EXAMPLE 1

120 g of a condensation product of 1 mol of pentaerythritol and 8 mols of propylene oxide, 58.8 g of maleic anhydride and 0.4 g of di-(tert.-butyl)-p-cresol are warmed to 90° C. under nitrogen and with stirring for 2 hours. 64 g of diethylene glycol, 40 g of coconut fatty acid, 150 g of toluene and 1 g of 96% strength sulphuric acid are then added, the mixture is heated to the boil and about 15 g of water are distilled off azeotropically in the course of 4½ hours. 10 g of anhydrous sodium carbonate are added to the solution, which has been cooled to room temperature, and the mixture is stirred for 30 minutes. The resulting salt is filtered off and the solvent is distilled off in vacuo. 76 g of phthalic anhydride and 4 g of tri-n-butylamine are added to the residue, which is a yellow oil, and the mixture is warmed to 100° C. for 3 hours. This gives 344 g of a yellow viscous oil, corresponding to a yield of 100%.

EXAMPLE 2

The procedure described in Example 1 is repeated, except that, in place of 40 g of coconut fatty acid, 56.4 g of oleic acid are employed, affording 360 g of a yellowish brown oil, corresponding to a yield of 100%.

EXAMPLE 3

The procedure described in Example 1 is repeated, except that, in place of 40 g of coconut fatty acid, 51 g of palmitic acid are employed, affording 355 g of a yellow viscous oil, corresponding to a yield of 100%.

EXAMPLE 4

The procedure described in Example 1 is repeated, except that, in place of 40 g of coconut fatty acid, 56.8 g of stearic acid are employed, affording 360 g of a slightly yellow paste, corresponding to a yield of 100%.

EXAMPLE 5

The procedure described in Example 1 is repeated, except that, in place of 64 g of diethylene glycol, 38 g of ethylene glycol are employed, affording 318 g of a yellow highly viscous oil, corresponding to a yield of 100%.

EXAMPLE 6

The procedure described in Example 1 is repeated, except that, in place of 64 g of diethylene glycol, 120 g of polyethylene glycol having an average molecular weight of 200 are employed, affording 400 g of a yellow viscous oil, corresponding to a yield of 100%.

EXAMPLE 7

The procedure described in Example 1 is repeated, except that, in place of the condensation product of 1 mol of pentaerythritol and 8 mols of propylene oxide, 80 g of a condensation product of 1 mol of pentaerythritol and 4 mols of propylene oxide are employed, affording 304 g of a yellow viscous oil, corresponding to a yield of 100%.

EXAMPLE 8

The procedure described in Example 1 is repeated, except that, in place of 40 g of coconut fatty acid, 56 g of stearic acid are employed and, in place of 64 g of diethylene glycol, 120 g of polyethylene glycol having an average molecular weight of 200 are employed, affording 416 g of a yellow viscous oil, corresponding to a yield of 100%.

EXAMPLE 9

The procedure described in Example 1 is repeated, except that, in place of 58.8 g of maleic anhydride, 68.3 g of glutaric anhydride are employed, affording 353 g of a yellow viscous oil, corresponding to a yield of 100%.

EXAMPLE 10

The procedure described in Example 1 is repeated, except that, in place of 58.8 g of maleic anhydride, 60 g of succinic anhydride are employed, affording 345 g of a yellow viscous oil, corresponding to a yield of 100%.

EXAMPLE 11

120 g of a condensation product of 1 mol of pentaerythritol and 8 mols of propylene oxide, 58.8 g of maleic anhydride and 0.4 g of di-(tert.-butyl)-o-cresol are warmed to 90° C. under nitrogen and with stirring for 2 hours. 120 g of polyethylene glycol having an average molecular weight of 200, 40 g of coconut fatty acid and 1 g of 96% strength sulphuric acid are then added and the reaction mixture is kept at 110° C. in vacuo for 4 hours, 15 g of water being distilled off. The mixture is then cooled to room temperature and 1,6 g of a 50% strength solution of sodium hydroxide are added. 76 g of phthalic anhydride are added to the resulting yellow oil and the mixture is heated at 100° C. for 3 hours. This gives 400 g of a yellow viscous oil, corresponding to a yield of 100%.

EXAMPLE 12

The procedure described in Example 11 is repeated, except that, in place of the condensation product of 1 mol of pentaerythritol and 8 mols of propylene oxide, 80 g of a condensation product of 1 mol of pentaerythritol and 4 mols of propylene oxide are employed, affording 360 g of a yellow viscous oil, corresponding to a yield of 100%.

EXAMPLE 13

The procedure described in Example 11 is repeated, except that, in place of 120 g of polyethylene glycol, 240 g of polypropylene glycol having an average molecular weight of 400 are employed, affording 520 g of a yellow oil, corresponding to a yield of 100%.

EXAMPLE 14

120 g of a condensation product of 1 mol of pentaerythritol and 8 mols of propylene oxide, 87.6 g of dimethyl succinate, 120 g of tetraethylene glycol, 0.5 g of anhydrous calcium acetate and 1 g of antimony trioxide are heated to 170° C. under nitrgen with stirring, 10 cm$^3$ of methanol being distilled off. As soon as the elimination of methanol subsides, the internal temperature is raised to 205° C. A further 22 cm$^3$ of methanol distil off in the course of about 3 hours. The melt is cooled to 110° C. and, after adding 40 g of coconut fatty acid and 2 g of 96% strength sulphuric acid, is kept at 110° C. in vacuo for 4 hours. 3.6 g of water being distilled off. The mixture is then cooled to room temperature and 3.2 g of a 50% strength solution of sodium hydroxide are added. 76 g of phthalic anhydride are added to the resulting yellowish brown oil and the mixture is heated at 100° C. for 3 hours. This gives 400 g of a yellowish brown viscous oil, corresponding to a yield of 100%.

EXAMPLE 15

80 g of a condensation product of 1 mol of glycerol and 5 to 6 mols of propylene oxide, 39.2 g of maleic anhydride and 0.4 g of di-(tert.-butyl)-β-cresol are warmed to 90° C. under nitrogen and with stirring for 2 hours. 80 g of tetraethylene glycol, 55 g of stearic acid and 0.8 g of 96% strength sulphuric acid are then added and the reaction mixture is kept at 110° C. in vacuo for 4 hours, 10.5 g of water being distilled off. The mixture is cooled to room temperature and 1.3 g of a 50% strength solution of sodium hydroxide are added. 59.2 g of phthalic anhydride are added to the oil and the mixture is heated at 100° C. for 3 hours. This gives 305 g of a pale yellow viscous oil, corresponding to a yield of 100%.

EXAMPLE 16

100 kg of loose wool are wetted with 2,500 l of water at 50° C. in a circulation dyeing apparatus. 1,500 g of 80% strength acetic acid and 2,500 g of a preparation consisting of 15% of the product prepared according to Example 1, 15% of a mixture Q of component $B_1$ and the di-(2-hydroxyethyl)-amine salt of sulphated lauryl alcohol triglycol ether in a weight ratio of 1:1, 15% of component $A_2$, 3% of 30% strength sodium hydroxide solution and 52% of water, are then added to the circulating liquor and the liquor is allowed to circulate for a further 10 minutes. 1,000 g of a 1:2 chromium mixed complex containing one dye molecule of each of the formulae:

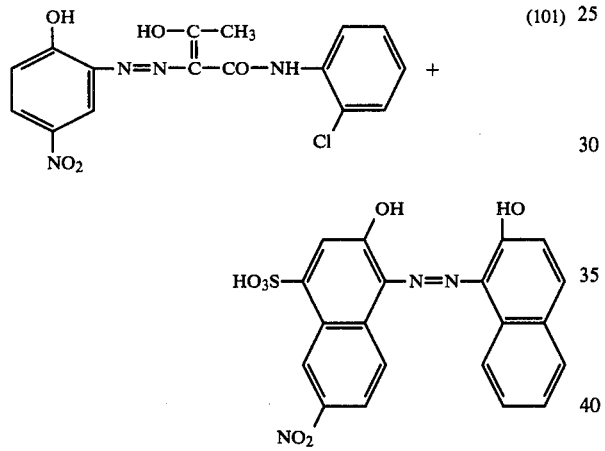

are then added to the liquor. The dye liquor is heated to the boil in the course of 30 minutes and the wool is dyed at the boil for 30 minutes. The wool is then centrifuged and dried. A uniform olive dyeing with excellent fastness to rubbing and wet fastness properties is obtained.

EXAMPLE 17

The procedure described in Example 16 is repeated, using, in place of the preparation described in Example 16, 2,500 g of another preparation consisting of 24% of the product prepared according to Example 1, 6% of component $B_4$, 10% of component $A_{14}$, 20% of tributyl phosphate and 40% of ethylene glycol monoethyl ether. A level olive wool dyeing with excellent fastness to rubbing and wet fastness properties is again obtained.

EXAMPLE 18

The procedure described in Example 16 is repeated, using, in place of the preparation described in Example 16, 2,500 g of another preparation consisting of 15% of the product prepared according to Example 11, 15% of a mixture of component $B_1$ and the di-(2-hydroxyethyl)-amine salt of sulphated lauryl alcohol triglycol ether in a weight ratio of 1:1, 15% of component $A_2$, 3% of 30% strength sodium hydroxide solution and 52% of water.

A level olive wool dyeing with excellent fastness to rubbing and wet fastness properties is again obtained.

EXAMPLE 19

The procedure described in Example 16 is repeated, using, in place of the preparation described in Example 16, 2,500 g of another preparation consisting of 15% of the product prepared according to Example 1, 30% of component $A_2$, 5% of tributyl phosphate, 3% of tri-(2-hydroxyethyl)-amine and 47% of water. A level olive dyeing with excellent fastness to rubbing and wet fastness properties is again obtained.

EXAMPLE 20

100 kg of wool slubbing are put into a pack dyeing apparatus which contains 1,000 l of water at 70° C.

4,000 g of ammonium sulphate, 1,000 g of 80% strength acetic acid and 3,000 g of the preparation described in Example 16 are then added. After 10 minutes, 4,000 g of a 1:2 chromium mixed complex containing one dye molecule of each of the formulae:

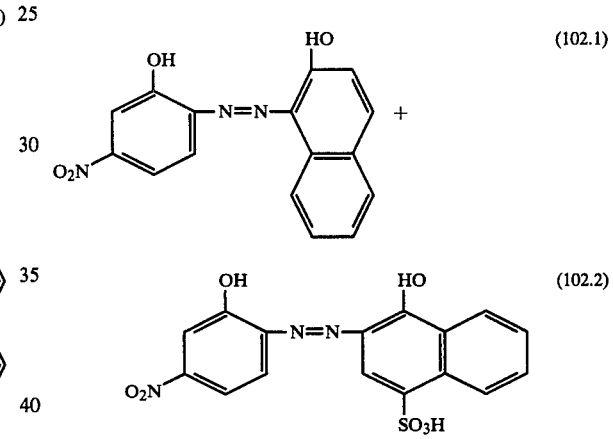

are added and the bath is heated to the boil in the course of 30 minutes, after which the wool is dyed at this temperature for 45 minutes. The dyeing is then rinsed and dried. A level navy blue dyeing with excellent fastness properties is obtained.

EXAMPLE 21

100 kg of loose wool are wetted with 1,000 l of water at 70° C. in a pack dyeing apparatus. The following additives are then introduced at intervals of 5 minutes: 1,500 g of 80% strength acetic acid, 2,000 g of the preparation described in Example 16 and 2,000 g of a 1:2 chromium mixed complex containing one dye molecule of each of the formulae:

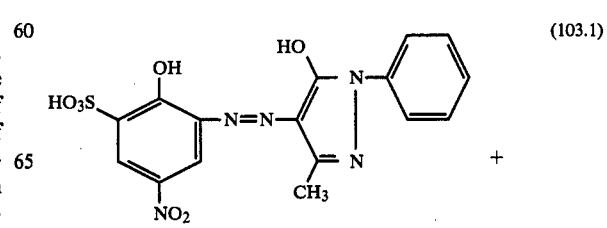

-continued

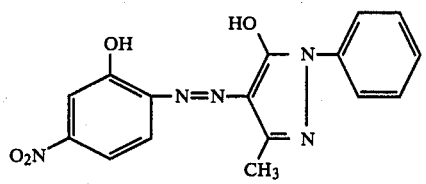
(103.2)

The dye liquor is then brought to the boil in the course of 30 minutes and the wool is dyed at the boil for 30 minutes. The wool is then centrifuged and dried. A level and fast red dyeing is obtained.

EXAMPLE 22

1,000 l of water are warmed to 70° C. in a pack dyeing apparatus with a replaceable material carrier and 100 kg of loose wool are wetted at 70° C. The following additives are then introduced at intervals of 5 minutes: 2,000 g of 80% strength acetic acid, 2,500 g of the preparation described in Example 16 and 2,000 g of a yellow dye of the formula:

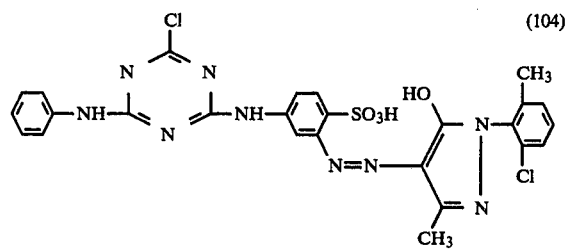
(104)

The dye liquor is then heated to the boil in the course of 30 minutes and the wool is dyed at this temperature for 30 minutes. The material carrier is then withdrawn and the wool is centrifuged and dried.

The residual liquor is bulked with cold water to a volume of 1,000 l and the temperature of the bath is adjusted to 70° C. A fresh material carrier with a further 100 kg of loose wool is then put into the dye bath. The following additives are then introduced into the liquor: 2,000 g of 80% strength acetic acid, 2,500 g of the preparation described in Example 16 and 2,000 g of a yellow 1:2 cobalt complex of a dye of the formula:

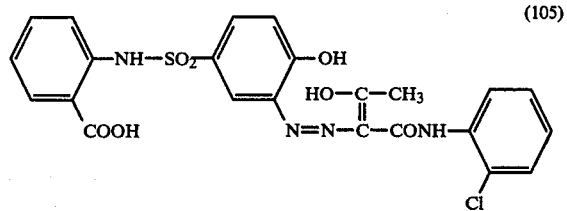
(105)

The dye liquor is then heated to the boil in the course of 30 minutes and the wool is dyed at this temperature for 30 minutes. The material carrier is again withdrawn and the wool is treated as in the case of the first dyeing.

A further 6 dyeings are obtained in the manner described above using, in each case, a residual liquor which has been bulked with water to 1,000 l and warmed to 70° C. and 100 kg of loose wool, the liquors for the individual dyeings containing the following additives:

3rd Dyeing: 2,500 g of the preparation described in Example 16, 1,000 g of 80% strength acetic acid and 2,000 g of an orange 1:2 chromium mixed complex containing one dye molecule of each of the formulae:

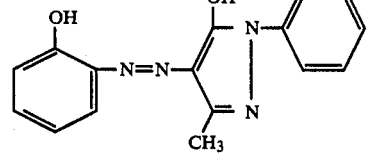
(106.1)

+

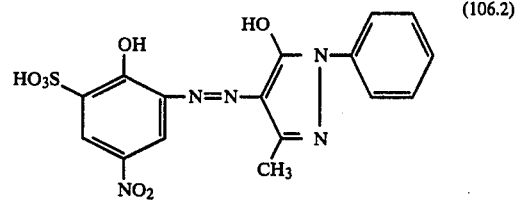
(106.2)

4th Dyeing: 2,500 g of the preparation described in Example 16, 3,000 g of 80% strength acetic acid and 2,000 g of the 1:2 chromium mixed complex dye of the compounds of the formulae (103.1) and (103.2).

5th Dyeing: 2,500 g of the preparation described in Example 16, 2,000 g of 80% strength acetic acid and 2,000 g of the reddish brown 1:2 chromium mixed complex containing one dye molecule of each of the formulae:

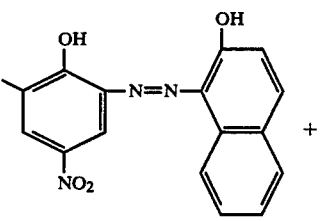
(107.1)

+

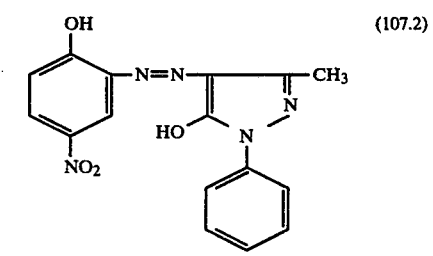
(107.2)

6th Dyeing: 2,500 g of the preparation described in Example 16, 3,000 g of 80% strength acetic acid and 2,000 g of a dark brown 1:2 chromium mixed complex containing one dye molecule of each of the formulae:

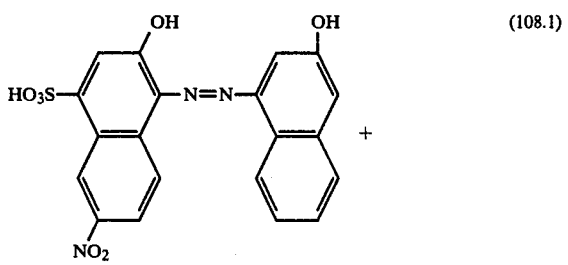
(108.1)

+

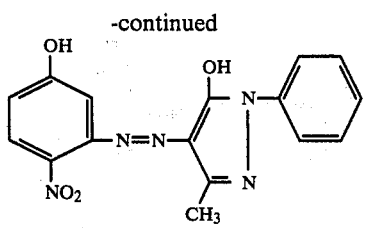 (108.2)

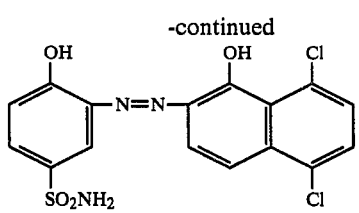 (110.4)

7th Dyeing: 2,500 g of the preparation described in Example 16, 3,000 g of 80% strength acetic acid and 2,000 g of the grey 1:2 chromium mixed complex containing one dye molecule of each of the formulae:

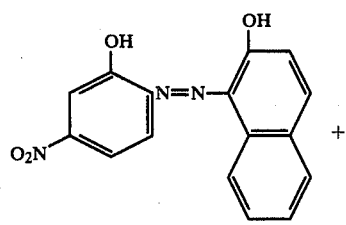 (109.1)

onto the 1:1 chromium complex of the dye of the formula:

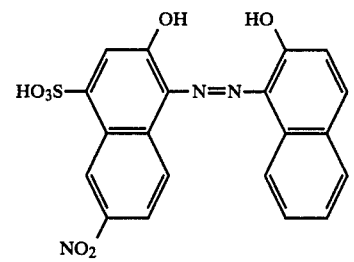 (110.5)

+

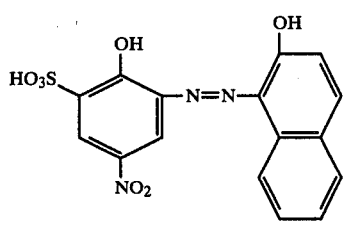 (109.2)

In the case of the last dyeing, the wool is dyed at the boil for 45 minutes instead of for 30 minutes.

In respect of colour shade and fastness properties, the resulting eight dyeings are equal to the corresponding dyeings obtained using a fresh dye bath in each case. However, they are produced in half the dyeing time.

When the procedure described in Example 22 is repeated exactly, except that, in each case, a dye liquor without the preparation described in Example 16 is used, less fast, skittery dyeings with a changed colour shade are obtained because in each case dye from the preceding dyeings has remained in the dye bath.

8th Dyeing: 2,500 g of the preparation described in Example 16, 2,000 g of 80% strength acetic acid and 4,000 g of a black 1:2 chromium mixed complex dye which has been obtained by adding a mixture of the dyes of the formulae (a) to (d):

EXAMPLE 23

100 kg of wool plied yarn in 3,000 l of water are dyed in a hank dyeing apparatus as follows:

The dye liquor is warmed to 40° C. and 2,000 g of ammonium sulphate and 2,000 g of 80% strength acetic acid are then added.

The material is then introduced and 2,000 g of an assistant preparation I containing: 15% of the product prepared according to Example 13, 14 or 15, 15% of component $A_2$, 15% of the mixture Q described in Example 16, 4% of 30% strength sodium hydroxide solution and 51% of water are added to the dye bath via a batch container.

The direction of the liquor is changed every 3 minutes. A solution of the dye, which is 2,000 g of the 1:2 chromium mixed complex containing one dye of each of the formulae:

(a) 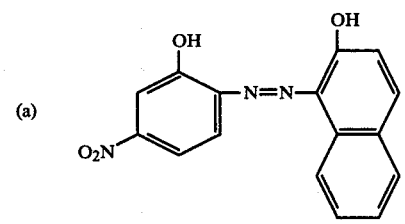 (110.1)

(b) 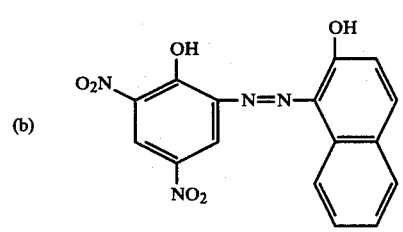 (110.2)

(c) 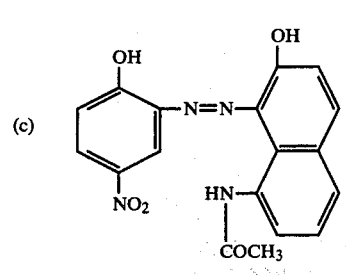 (110.3)

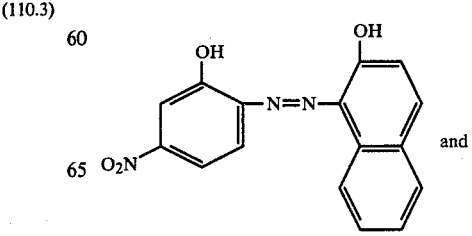 (111.1)

and

-continued

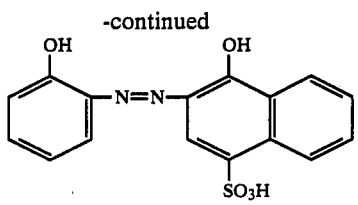 (111.2)

and 2,000 g of the dye of the formula:

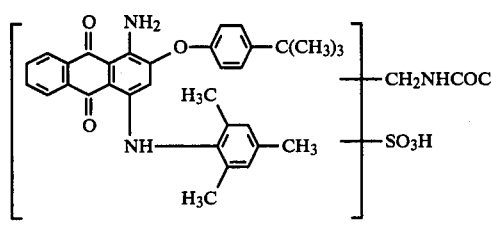 (112)

is then added. The bath is then heated to the boil in the course of 40 minutes and boiled for 30 minutes. The dye bath is virtually completely exhausted. If dyeing is carried out without the assistant preparation, the exhaustion of the bath is significantly less on the one hand and the level of fastness properties is unsatisfactory.

Dyeing can be carried out with equal success in the presence of the following preparations, in place of the indicated preparation I:

II. 15% of the product according to Example 11, 15% of component $A_7$, 15% of the mixture Q described in Example 16, 4% of 30% strength sodium hydroxide solution and 51% of water.

III. 15% of the product according to Example 11, 15% of component $A_2$, 15% of component $B_6$ and 4% of 30% strength sodium hydroxide solution.

IV. 15% of the product according to Example 11, 15% of component $A_2$, 15% of the mixture Q described in Example 16, 20% of benzyl alcohol, 3% of 30% strength sodium hydroxide solution and 32% of water.

EXAMPLE 24

100 kg of wool slubbing are wetted with 1,000 l of water at 50° C. 1,500 g of 80% strength acetic acid and 1,500 g of the following assistant preparation are then added: 5% of the product according to Example 11, 5% of component $A_2$, 5% of a mixture of component $B_1$ and the diethanolamine salt of sulphated lauryl alcohol triglycol ether in a weight ratio of 1:1, 16.5% of component $C_2$ (n+m=8), 1.5% of 30% strength sodium hydroxide solution and 67% of water.

After the additives to the bath have been uniformly dispersed, 750 g of a 1:2 chromium mixed complex, which has been obtained by adding a mixture of the dyes of the formulae (a) to (d):

(a) 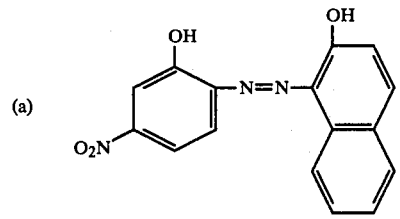 (113.1)

-continued (b) 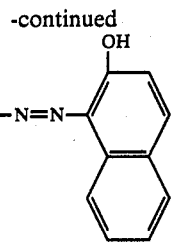 (113.2)

(c) 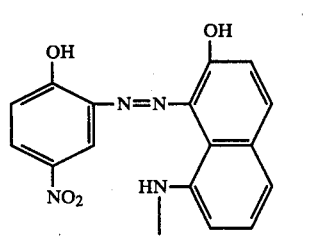 (113.3)

(d) 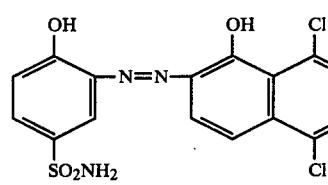 (113.4)

onto the 1:1 chromium complex of the dye of the formula:

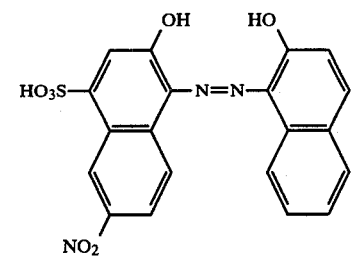 (113.5)

and 200 g of the 1:2 chromium mixed complex containing one dye molecule of each of the formulae (109.1) and (109.2) are also added.

Afterwards the dye bath is brought to the boil in the course of 30 minutes and boiled for 45 minutes. It is then cooled and the dyeing is rinsed.

A dyeing with very good levelness results. The very good exhaustion of the dye bath is worthy of note. As a result of this it is possible to use the dye bath again for further dyeings and to make a contribution towards reducing the amounts of coloured waste waters.

The reproducibility of the shades is very good.

The dyeings can be further improved if, in place of 16.5% of component $C_2$, 8.25% of component $C_2$ and 8.25% of component $D_2$ are employed.

In place of the assistant preparation used in the present case, preparations containing the components indicated below can also be employed with equal success:

Component (1): the products prepared according to Examples 1 to 12;
Component (2): $A_1$ or $A_3$ to $A_{18}$;
Component (3): $B_2$ to $B_6$;
Component (4): 2-ethylbutanol, trimethylhexanol, neopentylglycol, benzyl alcohol, furfuryl alcohol, ethyl benzoate, methyl salicylate, methyl or ethyl lactate, propylene carbonate, acetoacetic acid diethylamide, N,N-bis-(2-hydroxyethyl)-1,3-dichloroanilide, N-phenylurea, N,N-diethylthiourea, dioctyl phthalate, tricresyl phosphate and tributyl phosphate;
Component (5): $C_1$ and $C_3$ to $C_7$;
Component (6): $D_1$.

EXAMPLE 25

4 g of the reddish brown 1:2 chromium mixed complex containing one dye molecule of each of the formulae (107.1) and (107.2) are boiled up with 70 g of hot water and after cooling the resulting mixture is mixed with 4 g of the assistant preparation used in Example 24. This mixture is then dried by evaporating to give a powder.

If this dye powder is added to the dye bath, the dyeings obtained are similarly good and level to those obtained when the dye and assistant preparation are added together only in the dye bath.

We claim:

1. A process for dyeing fibrous material made of or containing wool with anionic dyes, which comprises applying, before or during dyeing, to said material an aqueous liquor containing a preparation which contains
   (1) a propylene oxide polyadduct containing carboxyl groups, or a salt thereof, obtained from
      (a) an adduct of propylene oxide and a trihydric to hexahydric alcohol having 3 to 6 carbon atoms,
      (b) a saturated or ethylenically unsaturated aliphatic dicarboxylic acid or the anhydride thereof having 4 to 10 carbon atoms
      (c) an aliphatic diol of the formula HO—$(CH_2CH_2O)_n$H, wherein n is 1 to 40
      (d) a fatty acid having 8 to 22 carbon atoms and
      (e) a monocyclic or dicyclic aromatic dicarboxylic acid or the anhydride thereof having 8 to 12 carbon atoms, which component (e) is condensed with the reaction product of components (a), (b), (c) and (d), and
   (2) a non-ionic, surface-active alkylene oxide adduct of a monoalcohol having at least 8 carbon atoms, a trihydric to hexahydric aliphatic alcohol, phenol, a phenol which is substituted by alkyl or phenyl, a fatty acid having 8 to 22 carbon atoms or a dicarboxylic acid having 3 to 10 carbon atoms.

2. A process according to claim 1, wherein said preparation additionally contains one or more of the following components:
   (3) a reaction product of a fatty acid having 8 to 22 carbon atoms and a primary or secondary amine containing at least one hydroxy-lower alkyl or lower alkoxy-lower alkyl group, or an alkylene oxide adduct of said reaction product containing hydroxyalkyl groups,
   (4) a water-immiscible solvent which boils above 80° C.,
   (5) an anionic surfactant, or
   (6) an amphoteric surfactant.

3. A process according to claim 1, wherein the preparation additionally contains an anionic surfactant as component (5).

4. A process according to claim 1, wherein the preparation additionally contains an amphoteric surfactant as component (6).

5. A process according to claim 2, wherein the preparation contains components (1), (2), (3) and (5).

6. A process according to claim 1, wherein the preparation additionally contains water, a water-miscible organic solvent or a mixture thereof.

7. A process according to claim 1, wherein the component (2) is an adduct of 1 to 65 mols of an alkylene oxide and 1 mol of an aliphatic monoalcohol having at least 8 carbon atoms, phenol, a phenol which is substituted by alkyl or phenyl, or a fatty acid having 8 to 22 carbon atoms.

8. A process according to claim 7, wherein the component (2) is an adduct of the formula:

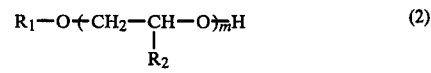

wherein $R_1$ is alkyl or alkenyl, each having 8 to 18 carbon atoms, o-phenylphenyl or alkylphenyl having 4 to 12 carbon atoms in the alkyl moiety, $R_2$ is hydrogen or methyl and m is 1 to 40.

9. A process according to claim 8, wherein the component (2) is an adduct of 3 to 5 mols of ethylene oxide and 1 mol of 3-ethyl-n-hexanol.

10. A process according to claim 2, wherein the component (3) is a reaction product of a fatty acid containing 8 to 22 carbon atoms and a hydroxy-lower alkylamine or a mixture of these amines.

11. A process according to claim 10, wherein the component (3) is an amide from a fatty acid having 8 to 22 carbon atoms and a hydroxy-lower alkylamine.

12. A process according to claim 11, wherein the component (3) is bis-ω-hydroxy-lower alkylamide of a fatty acid having 8 to 22 carbon atoms.

13. A process according to claim 12, wherein the component (3) is a bis-(2-hydroxyethyl)-amide or bis-(3-hydroxypropyl)amide of a coconut fatty acid.

14. A process according to claim 2, wherein the preparation contains, as components (3) and (5), a mixture of a fatty acid alkanolamide and an anionic surfactant.

15. A process according to claim 14, wherein the component (3) is coconut fatty acid N,N-(2-hydroxyethyl)-amide and the component (5) is bis-(2-hydroxyethyl)-amine salt of sulphated lauryl alcohol triethyleneglycol ether.

16. A process according to claim 10, wherein the component (3) is a reaction product of 1 mol of coconut fatty acid and 2 mols of di(2-hydroxyethyl)amine.

17. A process according to claim 2, wherein the component (4) is tributyl phosphate.

18. A process according to claim 2, wherein the component (5) is a compound of the formula:

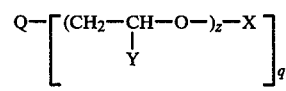

in which Q is $A_1$—O—, $A_2$—CO—O or $A_3$—N<, Y is hydrogen, methyl or phenyl, $A_1$ is an aliphatic hydrocarbon radical having 8 to 22 carbon atoms, a cycloaliphatic hydrocarbon radical having 10 to 22 carbon atoms, o-phenylphenyl or an alkylphenyl radical having 4 to 16 carbon atoms in the alkyl moiety, $A_2$ is an aliphatic hydrocarbon radical having 7 to 21 carbon atoms, $A_3$ is an aliphatic hydrocarbon radical having 12 to 22 carbon atoms, X is the acid radical of an inorganic, oxygen-containing acid or of a dicarboxylic acid, or is the radical —$CH_2COOH$, z is 1 to 20 and q is 1, or 2 if Q is $A_3$—N<, the two substituents on the nitrogen atom being identical to or different from one another.

19. A process according to claim 18, wherein the component (5) is a compound of the formula:

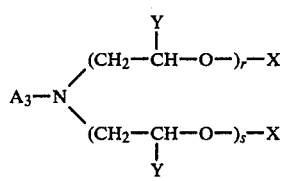

wherein $A_3$, Y and X are as defined in claim 18 and r and s are integers, the sum of which is 2 to 10.

20. A process according to claim 18, wherein the component (5) is a mixture of different anionic surfactants.

21. A process according to claim 4, wherein the component (6) is a quaternised acid ester, or a salt thereof, of a compound of the formula:

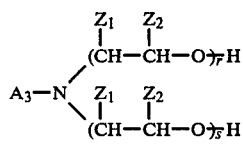

wherein:
$A_3$ is an aliphatic hydrocarbon radical having 12 to 22 carbon atoms, r and s are integers, the sum of which is 2 to 10 and one of $Z_1$ and $Z_2$ is hydrogen, methyl or phenyl and the other is hydrogen.

22. A process according to claim 2, wherein the preparation contains 10 to 70 percent by weight of component (1), 5 to 30 percent by weight of component (2), 0 to 25 percent by weight of component (3), 0 to 20 percent by weight of component (4), 0 to 5 percent by weight of a base and 0 to 65 percent by weight of water, a water-miscible organic solvent or a mixture of water and the solvent, the percentages in each case being based on the total preparation.

23. A process according to claim 22, wherein the preparation contains 10 to 30 percent by weight of component (1), 5 to 20 percent by weight of component (2), 5 to 20 percent by weight of component (3), 0 to 20 percent by weight of component (4), 1 to 3 percent by weight of an alkali metal hydroxide and 10 to 60 percent by weight of isopropanol, β-ethoxyethanol, water or a mixture of water and said solvents, the percentages in each case being based on the total preparation.

24. A process according to claim 2, wherein the weight ratio of component (1) to component (2) is 10:1 to 1:3 and the weight ratio of component (1) to component (3) is 4:1 to 1:2.

25. A process according to claim 2, wherein the preparation contains 3 to 10 percent by weight of component (1), 3 to 10 percent by weight of component (2), 3 to 10 percent by weight of component (3), 0 to 10 percent by weight of component (4), 10 to 20 percent by weight of component (5), 0 to 15 percent by weight of component (6), 0.5 to 5 percent by weight of a base and to 70 percent by weight of a watermiscible organic solvent, water or a mixture thereof.

26. A process according to claim 1, wherein the aqueous liquor contains 0.5 to 4 percent by weight of the preparation, based on the fibrous material.

27. A process according to claim 1, wherein the anionic dyestuff is a 1:2 metal complex dye.

28. A process according to claim 27, wherein the dyestuff is a 1:2 chromium mixed complex of azo dyes and contains one sulphonic acid group.

29. A process according to claim 1, wherein the aqueous liquor has a pH value of 4 to 7.

30. A process according to claim 1, which comprises dyeing at a temperature of 60° to 120° C.

31. A process according to claim 1, which comprises dyeing for 15 to 45 minutes.

32. A process according to claim 1, which comprises reusing the aqueous liquor any desired number of times after the dyeing operation, with the addition of a further dye and the ether additives.

33. An aqueous dye liquor for dyeing fibrous material made of or containing wool, which contains at least one anionic dye and a preparation containing
(1) a propylene oxide polyadduct containing carboxyl groups, or a salt thereof, as defined in claim 1,
(2) a non-ionic, surface-active alkylene oxide adduct of a monoalcohol having at least 8 carbon atoms, a trihydric to hexahydric aliphatic alcohol, phenol, a phenol which is substituted by alkyl or phenyl, a fatty acid having 8 to 22 carbon atoms or a dicarboxylic acid having 3 to 10 carbon atoms, and, optionally, one or more of the following components:
(3) a reaction product of a fatty acid having 8 to 22 carbon atoms and a primary or secondary amine containing at least one hydroxy-lower alkyl or lower alkoxy-lower alkyl group, or an alkylene oxide adduct of said reaction product containing hydroxyalkyl groups,
(4) a water-immiscible solvent which boils above 80° C.,
(5) an anionic surfactant and
(6) an amphoteric surfactant.

34. A preparation which contains 10 to 70 percent by weight of component (1) as defined in claim 2, 5 to 30 percent by weight of component (2) as defined in claim 2, 0 to 25 percent by weight of component (3) as defined in claim 2, 0 to 20 percent by weight of component (4) as defined in claim 2, 0 to 5 percent by weight of a base and 0 to 65 percent by weight of water, a water-miscible organic solvent or mixture of water and said solvent, the percentages in each case being based on the total preparation.

35. A preparation according to claim 34 which contains 10 to 30 percent by weight of component (1), 5 to 20 percent by weight of component (2), 5 to 20 percent by weight of component (3), 0 to 20 percent by weight of component (4), 1 to 3 percent by weight of an alkali metal hydroxide and 10 to 60 percent by weight of isopropanol, β-ethoxyethanol, water or a mixture of water and said solvent, the percentages in each case being based on the total preparation.

36. A preparation according to claim 34, which contains 3 to 10 percent by weight of component (1), 3 to 10 percent by weight of component (2), 3 to 10 percent by weight of component (3), 0 to 10 percent by weight of component (4), 10 to 20 percent by weight of an anionic surfactant as component (5), 0 to 15 percent by weight of an amphoteric surfactant as component (6), 0.5 to 5 percent by weight of a base and 60 to 70 percent by weight of a water-miscible organic solvent, water or a mixture of water and said solvent, the percentages in each case being based on the total preparation.

37. A preparation according to claim 34 which also contains an anionic dye.

38. A fibrous material made of or containing wool dyed according to claim 1.

* * * * *